United States Patent [19]
Hänninen

[11] Patent Number: 5,487,178
[45] Date of Patent: Jan. 23, 1996

[54] RADIO SYSTEM BASE STATION INCLUDING PROVISION FOR GENERATING AND PROCESSING BOTH ANALOG AND DIGITAL RADIO LINK QUALITY MONITORING SIGNALS

[75] Inventor: Jouni Hänninen, Kiiminki, Finland

[73] Assignee: Nokia Telecommunications Oy, Espoo, Finland

[21] Appl. No.: 983,591

[22] PCT Filed: Jun. 5, 1992

[86] PCT No.: PCT/FI92/00176

§ 371 Date: Feb. 5, 1993

§ 102(e) Date: Feb. 5, 1993

[87] PCT Pub. No.: WO92/22963

PCT Pub. Date: Dec. 23, 1992

[30] Foreign Application Priority Data

Jun. 11, 1991 [FI] Finland .................. 912804

[51] Int. Cl.$^6$ ................... H04B 7/26
[52] U.S. Cl. ........... 455/67.4; 455/56.1; 375/216
[58] Field of Search ............. 455/67.1, 67.4, 455/53.1, 54.1, 56.1, 33.2, 68, 88; 379/60; 375/5

[56] References Cited

U.S. PATENT DOCUMENTS

| 4,481,489 | 11/1984 | Kurby | ............... | 375/5 X |
| 4,723,303 | 2/1988 | Koch | ............... | 455/67 |
| 5,008,953 | 4/1991 | Dahlin et al. | ............... | 375/5 X |

FOREIGN PATENT DOCUMENTS

| 353759 | 2/1990 | European Pat. Off. . |
| WO9112675 | 8/1991 | WIPO .............. H04B 7/005 |

OTHER PUBLICATIONS

WO, A1, 9112675 (Telenokia Oy) 22 Aug. 1991, p. 1, Line 1–Line 17.
NMT Doc 300–4, Oct. 1, 1992, Chapter 8.
NMT Doc 300–4, Oct. 1, 1992, Addenda of Feb. 7, 1991 pp. 6–8 & 26–30.

Primary Examiner—Reinhard J. Eisenzopf
Assistant Examiner—Philip J. Sobutka
Attorney, Agent, or Firm—Cushman Darby & Cushman

[57] ABSTRACT

The base station includes for monitoring the quality of a radio link between the base station and mobile stations, a generator (1, 2, 3) for generating a square wave signal (CK) having a monitoring signal frequency; and a filter (4) for generating a monitoring signal (CS) from the square wave signal (CK). The frequency of the monitoring signal is set by a control (12) having two modes of operation; in the first mode of operation, the control controls the generator to transmit an analog monitoring signal by maintaining the frequency of the square wave signal (CK) at a constant value throughout the duration of the monitored radio link, and in the second mode of operation, the control controls the generator (1, 2, 3) to transmit a digital monitoring signal by varying the frequency during the monitored radio link in response to changes in the logical state of the monitoring signal between a first frequency corresponding to the first logical state and a second frequency corresponding to the second logical state.

3 Claims, 1 Drawing Sheet

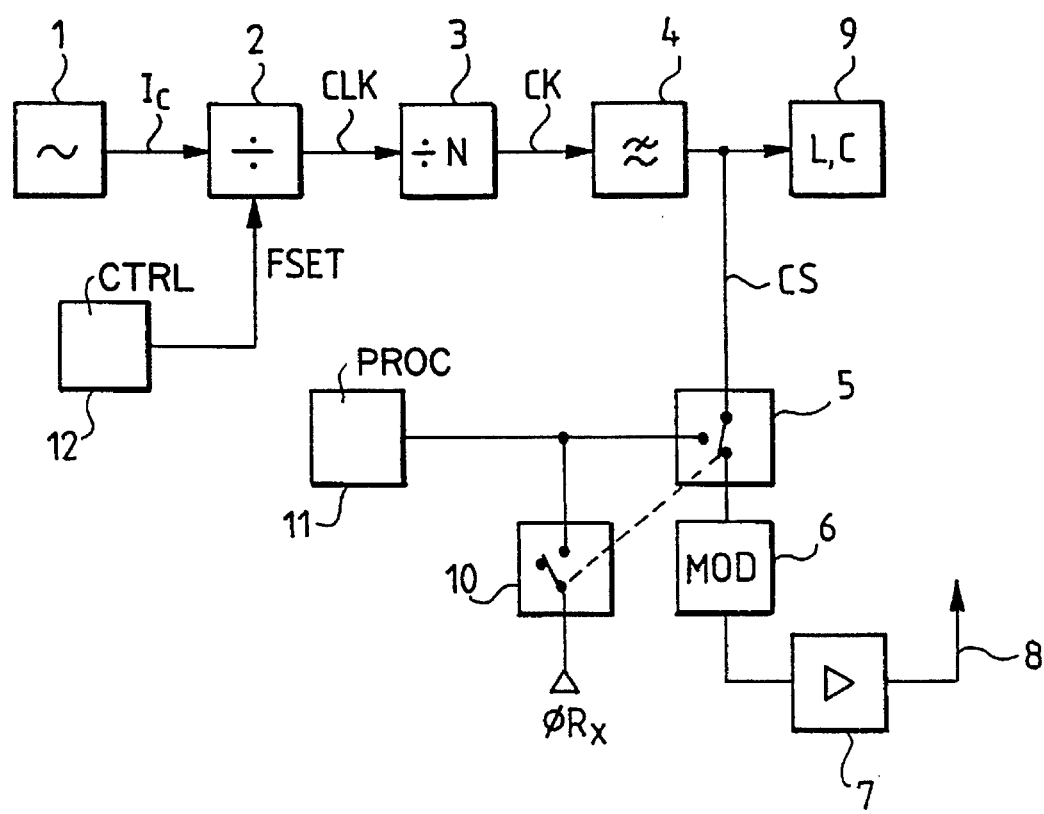

RADIO SYSTEM BASE STATION INCLUDING PROVISION FOR GENERATING AND PROCESSING BOTH ANALOG AND DIGITAL RADIO LINK QUALITY MONITORING SIGNALS

BACKGROUND OF THE INVENTION

The invention relates to a base station for a radio system, the base station comprising, for monitoring the quality of a radio link between the base station and mobile stations, generator means for generating a square wave signal having a desired monitoring signal frequency; control means for setting the frequency of the square wave signal; a filter means for generating a monitoring signal from the square wave signal; and a transmitter means for transmitting the monitoring signal to the mobile radio station.

In the Nordic Mobile Telephone (NMT) system, the quality of the radio link between a base station and a mobile telephone is monitored by means of special monitoring signals. The base station generates a monitoring signal by lowpass filtering from a clock signal having a desired monitoring signal frequency. The NMT system utilizes four monitoring signal frequencies at intervals of 30 Hz. The base station transmits a monitoring signal to a mobile telephone which returns the monitoring signal immediately to the base station, and the base station determines the quality of the used radio link, especially the signal-noise ratio, by means of the received monitoring signal. A radio system base station utilizing such a monitoring signal is disclosed in FI Patent Application 900620.

The new NMT systems include recommendations (ref. Addendum to NMT-Specification DOC 900-4 DRAFT dated 8.1. 1991) stating that a digital monitoring signal should be used in addition to an analog monitoring signal, and that the bit error ratio of the received digital monitoring signal should be used in addition to its S/N ratio as a criterion of quality. When the quality of the speech connection is above a predetermined threshold value, a digital monitoring signal is used, and when it is below the threshold value, an analog monitoring signal is used. The digital monitoring signal should be modulated so that the frequency 3,975 Hz corresponds to the digital logical state "1", and the frequency 4,025 Hz corresponds to the logical state "0". The decision to handover the call from one base station to another is also made on the basis of the monitoring signal.

SUMMARY OF THE INVENTION

The object of the present invention is to provide a base station capable of processing both analog and digital monitoring signals.

This is achieved by means of a base station of the type described in the introductory part of this specification, which according to the invention is characterized in that the control means comprise a first and a second mode of operation, the control means controlling the generator means in the first mode of operation to transmit an analog monitoring signal by maintaining the frequency of the square wave signal generated by the generator means at a constant value throughout the duration of the monitored radio link, and the control means controlling the generator means in the second mode of operation to transmit a digital monitoring signal by varying the frequency of the square wave signal generated by the generator means during the monitored radio link in response to changes in the logical state of the monitoring signal between a first frequency corresponding to the first logical state and a second frequency corresponding to the second logical state.

In practicing the invention, the same circuitry can be used for the generation of both the analog and the digital monitoring signals. The desired monitoring signal type is obtained simply by means of software selecting the frequency control mode corresponding to the desired type. The invention enables the use of the same monitoring signal circuitry both in the new and in the old systems.

The invention enables a very simple and advantageous realization of the monitoring signal generation circuitry.

BRIEF DESCRIPTION OF THE DRAWING

The invention will now be described in more detail by means of an illustrating embodiment with reference to the attached drawing, in which:

FIG. 1 shows a block diagram of a base station section required for the generation of monitoring signals.

DETAILED DESCRIPTION

The NMT system is a so-called cellular telephone system in which a geographical area covered by the system is divided into smaller, adjoining geographical areas or cells each comprising one or more fixed base stations in communication with mobile telephones within the cell. The structure of the NMT system will not be described in greater detail herein; instead, the following publications are referred to:

1. NMT Doc.4.1981 Technical Specification for the Base Station Equipment

2. NMT Doc.900-4 Technical Specification for the Base Station Equipment

3. Addendum to NMT Doc.900-4 Revised 1988-04-01.

4. NMT Doc. 900-1.

The above identified specifications are also referred to with regard to the signalling between the base station and the mobile telephone, and especially with regard to the monitoring signals. With regard to the digital monitoring signal, the following specifications are referred to:

5. Addendum to NMT Specification Doc. 900-4 DRAFT dated 22.1. 1991. Revised 8.5. 1991.

Referring to FIG. 1 hereof, the generation of monitoring signals at the base station will be discussed first. The base station comprises a source generating a clock signal, such as a crystal oscillator 1, which applies a clock signal $f_c$ to an adjustable or programmable frequency divider circuit 2. The divider circuit 2 divides the clock signal $f_c$ by a divisor determined by a frequency setting signal FSET, thus forming a primary clock signal CLK. The primary clock signal CLK is divided with a fixed divider circuit 3, which produces a square wave signal CK having the monitoring signal frequency. The square wave signal CK is low-pass filtered by a lowpass filtration block 4, which may include e.g. a switched capacitor low-pass filter and level adjustment. The structure, operation and advantages of such a SC lowpass filtration block 4 are described in FI Patent Application 900620, which is hereby incorporated by reference. The SC filter is controlled by a clock signal mCK derived from or synchronized with the primary clock signal CLK, so that its cutoff frequency is automatically adopted to the frequency of the square wave signal CK. The filtration block 4 thereby also includes a time continuous lowpass filter, which filters the clock signal frequency controlling the SC filter from the monitoring signal.

An output signal from the filtration block 4 is a sinusoidal monitoring signal CS, which in normal operation is applied through a switch unit 5 to the transmitter unit of the base station, which comprises a modulator 6 and a high-frequency output amplifier 7, to be transmitted through a transmitter antenna 8 to a mobile radio station, i.e. a mobile telephone.

The monitoring signal CS is further applied to a level indicator 9, which monitors the level of the monitoring signal, ensuring that it is in a window between predetermined limit values.

The monitoring signal returned by the mobile station and received by the base station by means of a receiver antenna and a receiver section Rx is applied through a switch unit 10 to a receiver and processing unit 11 for the monitoring signal. The unit 11 performs the recognition of the monitoring signal and at least the measurement of the S/N ratio in the case of an analog monitoring signal, and the S/N ratio, the bit error ratio measurement and the recognition in the case of a digital monitoring signal.

By means of the switch unit 5, the monitoring signal CS to be transmitted can be applied directly to the unit 11 in order to establish an internal test loop when there is no speech connection between the mobile radio station and the base station.

When the monitoring signal generation circuitry is used for the generation of a conventional analog monitoring signal, a control unit 12 operates in a first mode of operation, in which it, by means of the frequency setting signal FSET, controls or programs the divisor of the frequency divider circuit 2 such that the signal CK (and CS) has one of the four predetermined frequencies throughout the duration of the radio link to be monitored.

The frequency setting signal FSET is generated by the control unit 12, which may be used for this purpose only or, preferably, form part of a control unit used also otherwise for the control of the base station.

When the monitoring signal generation circuitry is used for the generation of a digital monitoring signal, the control unit 12 operates in a second mode of operation, in which it continuously MSK-modulates the monitoring signal during the radio link to be monitored for incorporating the desired binary information in the monitoring signal. The control unit 12 thereby updates the frequency divider 2 at regular intervals by means of the frequency setting signal FSET either with a divisor which gives a monitoring signal frequency corresponding to the logical state "1" (e.g. 3,975 Hz), or with a divisor which gives a monitoring signal frequency corresponding to the logical state "0" (e.g. 4,025 Hz), depending on whether the state "1" or "0" is to be incorporated in the digital monitoring signal at each specific moment. The updating of the divisor takes place at intervals of 10 ms, for instance. The mode of operation to be used in each specific case may be set manually to the control unit, or the control unit may automatically select the right mode of operation.

The figure and the description related to it are only intended to illustrate the present invention. In its details, the base station according to the present invention may vary within the scope of the attached claims.

I claim:

1. A base station for a radio system, the base station comprising, for monitoring the quality of a radio link between the base station and mobile stations:

generator means for generating a square wave signal having a desired baseband monitoring signal frequency;

control means for setting the baseband frequency of the square wave signal;

a filter means for generating a baseband monitoring signal from the baseband square wave signal; and a means for modulating the baseband monitoring signal to a transmitting frequency and for transmitting the transmitting frequency monitoring signal to the mobile radio station;

said control means comprising means for alternatively providing a first and a second mode of operation, the control means being arranged for controlling the generator means in the first mode of operation to transmit an analog monitoring signal by maintaining the baseband frequency of the square wave signal generated by the generator means at a constant value throughout the duration of the monitored radio link, and the control means being arranged for controlling the generator means in the second mode of operation to transmit a digital monitoring signal by varying the baseband frequency of the square wave signal generated by the generator means during the monitored radio link between a first baseband frequency corresponding to a first logical state and a second baseband frequency corresponding to a second logical state according to logical states to be transmitted;

said generator means comprising an oscillator means and at least one adjustable divider circuit which is connected in series with the oscillator means and said filter means, and the frequency of the monitoring signal being determined by the divisor of said adjustable divider circuit.

2. A base station according to claim 1, wherein:

the second mode of operation the generator means is arranged to provide a monitoring signal frequency of 3,975 Hz which corresponds to the logical state "1" as said first logical state and the generator means is arranged to provide a monitoring signal frequency of 4,025 Hz which corresponds to the logical state "0" as said second logical state.

3. A base station according to claim 1, wherein:

said control means is arranged to cause said divisor to be updated at intervals of about 10 ms.

* * * * *